United States Patent [19]

Wang et al.

[11] 4,231,868
[45] Nov. 4, 1980

[54] PROCESS FOR DEWATERING MINERAL AND COAL CONCENTRATES

[75] Inventors: Samuel S. Wang, Chesire; Morris E. Lewellyn, Stamford, both of Conn.

[73] Assignee: American Cyanamid Company, Stamford, Conn.

[21] Appl. No.: 1,137

[22] Filed: Jan. 5, 1979

[51] Int. Cl.³ .............................................. C02F 1/54
[52] U.S. Cl. ...................................... 210/728; 209/5; 210/729
[58] Field of Search ................... 209/5; 210/42 R, 43, 210/49, 51–54, 75; 252/60, 194; 560/149

[56] References Cited

U.S. PATENT DOCUMENTS

| 2,252,401 | 8/1941 | Jaeger | 560/149 |
| 2,266,954 | 12/1941 | Bonnet | 210/54 |
| 4,097,390 | 6/1978 | Wang et al. | 210/54 |
| 4,107,028 | 8/1978 | Emmett, Jr. et al. | 209/5 |
| 4,146,473 | 3/1979 | Edelmann et al. | 210/54 |
| 4,153,549 | 5/1979 | Wang et al. | 210/54 |
| 4,156,649 | 5/1979 | Quinn et al. | 210/51 |

FOREIGN PATENT DOCUMENTS

| 2079698 | 2/1970 | France | 210/54 |
| 443682 | 9/1975 | U.S.S.R. | 210/54 |

Primary Examiner—Charles N. Hart
Assistant Examiner—Peter A. Hruskoci
Attorney, Agent, or Firm—Paul W. Leuzzi, II

[57] ABSTRACT

Mineral and coal concentrates are effectively dewatered by a process wherein there is employed a dewatering aid comprising of an N-substituted sulfosuccinamate. The process provides for mixing the dewatering aid to an aqueous slurry of the concentrate and thereafter subjecting the treated slurry to filtration.

8 Claims, No Drawings

PROCESS FOR DEWATERING MINERAL AND COAL CONCENTRATES

BACKGROUND

This invention relates to a process for dewatering various mineral concentrates and coal. More particularly, this invention relates to a process wherein a dewatering aid is employed, the dewatering aid employed comprising an N-substituted sulfosuccinamate.

Valuable components of numerous minerals are concentrated by a variety of procedures that provide mineral concentrates that can then be further processed. One of the most widely used methods of concentration is froth flotation which is applicable to a wide variety of minerals including coal. After a mineral has been sufficiently enriched in valuable component by concentrating, it is usually subjected to dewatering so that it may be shipped more economically and/or further processed more readily. In dewatering, the mineral concentrate, in slurry form, is subjected to sedimentation, decantation, filtration or variations thereof to facilitate the removal of water therefrom. This removal of water decreases the weight of the concentrate and, in the case of coal, increases the BTU value per unit weight of concentrate; the removal of water by dewatering also reduces the energy requirements for subsequent evaporation of residual water when necessary, such as for smelting.

Sedimentation, in which the settling of suspended matter from the slurry is accomplished, is generally such an extremely slow process that it is generally the commercial practice to add a flocculating agent, such as glues, acids, starches, natural gums and the like, to cause the individual mineral particles to flocculate by interaction with the flocculating agent. Flocculation thus reduces the necessary holding time in settling basins or vessels before decantation of the supernatant liquor can be initiated Removal of the water from the resulting concentrated slurry is generally achieved through some form of filtration. The filter cake which forms during filtration is often substantially impermeable and filtration can be effected therethrough only at extremely slow rates and/or under extremely high pressures. Even when such an impermeable filter cake is not formed, it is advantageous to be able to accelerate the filtration speeds through the application of a dewatering aid which, when added in effective amounts to the concentrate slurry, reduces the residual water content thereof below that obtained in the absence of the additive, improves filter cake handling qualities and reduces binding of the filter medium. Surface active agents have long been known to be effective aids in the dewatering of mineral concentrates. Various flocculants have also been known to improve the filtration process. It was later found that the use of both a surface active agent and a flocculant led to advantages over either of the separate components alone at an equal total dosage.

In spite of the effectiveness of dewatering aids or combinations thereof, there nevertheless still exists the need for improved dewatering aids which provide lower residual water in the filtered concentrate and result in advantages thereby. Considering annual processing of many millions of tons of mineral ores and coal, such advantages could provide substantial savings in shipping costs and significant increases in available BTU values. The provision for improved dewatering aids, therefore, would fulfill a long-felt need and constitute a significant advance in the art.

SUMMARY

The process of the present invention, wherein a novel dewatering aid is employed, results in improved performance with respect to lowering the residual water content of filter cakes. Additionally, the dewatering aid employed in the process of the present invention increases the retention of mineral particles on the filter cake, decreases foaming of the filtrate and contributes to substantial savings of energy consumption utilized in subsequent mineral processing and freight charges.

DETAILED DESCRIPTION

In accordance with the present invention there is provided a process for dewatering mineral and coal concentrates which comprises mixing with an aqueous slurry of the mineral or coal concentrate a dewatering aid in an amount ranging from about 0.15 pound per ton to about 5.0 pounds per ton, said dewatering aid comprising an N-substituted sulfosuccinamate of the general structure:

wherein R is a linear or branched alkyl radical having four to fifteen carbon atoms, inclusive, R' is a linear or branched alkyl radical having four to fifteen carbon atoms, inclusive, and X is hydrogen or a salt-forming sulfonate, there being one X as hydrogen and one X as a salt-forming sulfonate, and thereafter subjecting the treated slurry to filtration.

Suitable N-substituted sulfosuccinamates may be prepared by any conventional procedure. For the purpose of illustrating the invention, one such procedure presently preferred is wherein a suitable amine is reacted with a suitable sulfosuccinate for about six to ten hours, preferably about eight hours, at a temperature ranging from about 100° C. to about 150° C., preferably about 120°–130° C., in a nitrogen atmosphere; it being understood, however, that production of the sulfosuccinamates used in the processing of this invention is not limited to this precise procedure.

Suitable amines for use in the preparation of the N-substituted sulfosuccinamates include butylamine, methyl propylamine, pentylamine, methyl butylamine, ethyl propylamine, hexylamine, methyl pentylamine, ethyl butylamine, heptylamine, methyl hexylamine, ethyl pentylamine, ortylamine, methyl heptylamine, ethyl hexylamine, methyl ethyl pentylamine, nonylamine, methyl octylamine, ethyl heptylamine, methyl ethyl hexylamine, decylamine, methyl nonylamine, ethyl octylamine, trimethyl heptytamine, undecylamine, methyl decylamine, dodecylamine, tridecylamine, tetradecylamine, pentadecylamine, and the like. Preferably, an alkylamine is employed wherein the alkyl moiety contains six to ten carbon atoms, inclusive.

Suitable sulfosuccinates for use in the preparation of the N-substituted sulfosuccinamates include di(butyl) sulfosuccinate, di(pentyl) sulfosuccinate, di(hexyl) sulfosuccinate, di(methyl pentyl) sulfosuccinate, di(heptyl) sulfosuccinate, di(methyl hexyl) sulfosuccinate, di(octyl) sulfosuccinate, di(methyl heptyl) sulfosuccinate, di(2-ethyl hexyl) sulfosuccinate, di(methyl ethyl pentyl)

sulfosuccinate, di(nonyl) sulfosuccinate, di(decyl) sulfosuccinate, di(undecyl) sulfosuccinate, di(dodecyl) sulfosuccinate and the like. Salts of these sulfosuccinates may likewise be employed in the preparation of the N-substituted sulfosuccinamate. Preferably, a di-alkyl sulfosuccinate is employed wherein the alkyl moiety contains six to ten carbon atoms, inclusive.

The reaction of the amine with the sulfosuccinate results in either an N-substituted 3-sulfosuccinamate or an N-substituted 4-sulfosuccinamate as well as small quantities of the imide and diamide side reaction products. Tests have shown imide and diamide compositions to have no appreciable effect on the process of the present invention, thus their inclusion with the dewatering aid employed in the process of the present invention, in small quantities, is not seen to produce any undesirable effects.

The reaction product works equally as well in the present invention with the sulfonate group attached either at the 3- or 4-position and therefore no distinction with respect to effectiveness is required.

The process of the present invention, when used for dewatering mineral concentrates, preferably is employed in conjunction with a flocculant. In carrying out such processing, use is made of any mineral concentrate that is conventionally subjected to dewatering. Particularly effective are those mineral concentrates that are obtained in the form of aqueous slurries of finely ground ores. Concentrates of copper and iron as the sulfides and oxides, salt minerals, coal refuse, fine coal, and the like, are preferred for processing using the dewatering aid of the present invention.

Additionally, the dewatering aid employed in the process of the present invention may be used in conjunction with various water soluble organic solvents such as alcohols, ketones or hydroxyethers without thereby producing any deleterious effects.

The N-substituted sulfosuccinamate dewatering aid has also been found to be compatible with anionic and nonionic surfactants. Although such a combination generally produces an effective amount of dewatering equal to that of substantially equivalent dosages of the N-substituted sulfosuccinamate alone, such combinations may be preferable depending upon the specific mineral being processed, the dewatering aid being employed, and the like.

The process of dewatering for which the combination dewatering aid is provided is such that water is removed in liquid form from a slurry of mineral concentrate in water. Thus, the term "dewatering," as that term is used herein, means that water is removed per se, that is in liquid form as opposed to vapor or solid form.

In carrying out the process of the present invention, an aqueous slurry of mineral concentrate is treated with an effective amount of the dewatering aid. The effective amount of the dewatering aid will generally vary depending upon factors such as the specific mineral being processed, the specific dewatering aid employed, and the like. Generally, from about 0.15 pound per ton to about 5.0 pounds per ton should be employed to achieve satisfactory results, preferably about 0.2 to about 1.0 pound per ton.

An effective amount of a cationic flocculant is generally added to the dewatering process in accordance with conventional procedures. Preferred flocculants include polydiallyldiamines, polyacrylamides, and the like. Additionally, water-soluble alcohols such as methyl, ethyl and isopropyl alcohol may be employed as co-solvents and/or fuel oil or mineral oil may be employed to control foaming.

After the dewatering aid and other reagents have been mixed with the aqueous slurry of mineral concentrate, the slurry is dewatered following conventional procedures to remove the liquid water. In the examples which follow, dewatering was effected using a pressure filter. Alternative procedures include air filtration, vacuum filtration, centrifugation, and the like.

Whereas the exact scope of the present invention is set out in the appended claims, the following specific examples illustrate certain aspects of the present invention. Although processing is illustrated using iron ore, it is to be understood that similar advantages result using other mineral concentrates. In carrying out the dewatering examples, an experimental procedure, as described below was employed. This procedure is found to correlate well with commercial procedures. All parts and percentages are by weight unless otherwise specified.

EXPERIMENTAL PROCEDURE

Iron ore slurry containing 60.5% solids was made homogeneous through stirring whereupon representative test samples of 99.2 parts each were taken by weighing the slurry into 250 ml beakers. The pH of the test samples was adjusted to a pH of 10.5, which is generally the normal operating pH in a processing plant. The slurry was then treated with reagents by pipette, using a 1% aqueous solution of the dewatering aid to be employed and a 0.1% aqueous solution of a flocculant, in this case, polydiallyldiamine. In each instance, the dewatering aid was added first while stirring, followed by 0.025 pound per ton of the flocculant after approximately one (1) minute had elapsed. After an additional minute of conditioning, the slurry was poured into a Fann Pressure Filter (1 liter capacity) using a 9 cm Whatman No. 1 filter paper. The pressure was opened to 10 psi for a period of 100 seconds in which the slurry underwent filtration. The pressure was then released and the wet filter cake weighted. The filter cake was next dried overnight at 150° F. and the dry weight obtained. The percent moisture was calculated as follows:

$$\% \text{ Moisture} = \frac{\text{Wet Weight} - \text{Dry Weight}}{\text{Wet Weight}} \times 100$$

EXAMPLE 1

The Experimental Procedure set forth above is followed in every material detail employing therein as a dewatering aid an N-substituted sulfosuccinamate of the general structure:

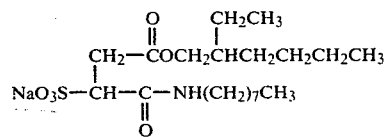

prepared by charging 50 parts of sodium di(2-ethylhexyl) sulfosuccinate and 15 parts of n-octylamine into a suitable reaction vessel fitted with a stirrer, condenser, thermometer and nitrogen inlet. The mixture is heated to 120°–130° C. under a nitrogen atmosphere for 8 hours. The resulting liquid is amber in color and has a solids content of 78%. The dewatering aid is applied over a range of dosages, test results for each dosage is shown in Table I.

To compare the results obtained employing the process of the present invention against similar processes utilizing different dewatering aids, the following comparative examples are run:

COMPARATIVE EXAMPLE A

The Experimental Procedure set forth above is followed in every material detail employing therein as the dewatering aid a mixture of 40% sodium di(2-ethyl hexyl) sulfosuccinate, 10% 2-ethylhexanol and 50% water. Test results are shown in Table I.

COMPARATIVE EXAMPLE B

The Experimental Procedure set forth above is followed in every material detail employing therein as the dewatering aid an N-octyl sulfosuccinimide prepared by neutralizing 178 parts of a 37% di-sodium N-octyl-sulfosuccinamate solution with 19.6 parts of 50% sulfuric acid. The excess water is then removed under reduced pressure yielding a white past-like material. 15 parts of this material and 20 ml of cymene are placed into a suitable reaction vessel equipped with a stirrer, nitrogen inlet and a Dean-Stark trap with condenser. The mixture is then heated under nitrogen atmosphere to reflux for 2 hours. Upon cooling to room temperature, a precipitate forms. This precipitate is filtered and washed with petroleum ether. Infrared analysis shows the reaction product to be the desired imide, which is applied as the dewatering aid over a range of dosages, test results for each being given in Table I.

COMPARATIVE EXAMPLE C

The Experimental Procedure set forth above is followed in every material detail employing therein as the dewatering aid a diamide prepared by removing the solvent, under reduced pressure, from a 4% aqueous solution of sodium di(isobutyl) sulfosuccinate. A white paste-like material is produced.

Into a suitable reaction vessel fitted with a Dean-Stark trap with condenser, thermometer, nitrogen inlet, and magnetic stirrer, there are placed 25 parts of the resulting white paste-like material prepared above and 20 ml of toluene. The mixture is then refluxed for 1-2 hours, giving about 3 ml of water. Into this mixture are added 25 parts of n-octylamine and the resulting mixture is heated to 120°-125° C. for 3 additional hours. During this period about 20 ml of solvent and some isobutylalcohol is removed by distillation. A yellow paste-like material is the resultant product which has a solids content on the order of 68%. Infrared analysis shows the reaction product to be the desired diamide, which is applied as the dewatering aid over a range of dosages, test results for each being given in Table I.

COMPARATIVE EXAMPLE D

The Experimental Procedure set forth above is followed in every material detail except that no dewatering aid is employed. Test results are given in Table I.

TABLE I

IRON CONCENTRATE DEWATERING RUNS

| EXAMPLE | DOSAGE (lb/ton Solids) | PERCENT MOISTURE |
|---|---|---|
| Comparative D | None | 18.2 |
|  | None | 17.7 |
|  | None | 18.3 |
|  | None | 18.1 |
| 1 | 0.2 | 17.3 |
|  | 0.3 | 16.5 |
|  | 0.3 | 16.2 |
|  | 0.4 | 16.2 |
|  | 0.4 | 15.5 |
|  | 0.5 | 15.8 |
|  | 0.5 | 15.4 |
|  | 0.6 | 14.9 |
|  | 0.6 | 15.0 |
| Comparative A | 0.2 | 17.1 |
|  | 0.2 | 17.8 |
|  | 0.3 | 16.5 |
|  | 0.3 | 16.2 |
|  | 0.4 | 16.2 |
|  | 0.4 | 16.0 |
|  | 0.5 | 16.2 |
|  | 0.5 | 16.5 |
|  | 0.6 | 16.6 |
| Comparative B | 0.3 | 17.7 |
|  | 0.4 | 17.7 |
|  | 0.5 | 17.7 |
|  | 0.6 | 17.6 |
| Comparative C | 0.2 | 18.5 |
|  | 0.4 | 18.4 |
|  | 0.5 | 18.2 |
|  | 0.6 | 18.2 |
|  | 0.7 | 18.5 |

The above results show that possible side products from the reaction of the alkyl amine and the sulfosuccinate, specifically the imide and diamide, when prepared separately and tested for their dewatering efficiencies exhibited results comparable with dewatering effected without the use of a dewatering aid. Although the sulfosuccinate alone exhibits substantially equivalent results at lower dosages, the dewatering aid employed in the process of the present invention exhibits surprisingly good results over a wider range of dosages, and is thereby a more versatile and effective dewatering agent.

The dewatering aid employed in the process of the present invention has been shown to be compatible with varying amounts of anionic and nonionic surfactants, the total dosage within the range from about 0.15 pounds per ton to 5.0 pounds per ton.

EXAMPLE 2

The procedure of Example 1 is followed in every material detail except that a 1 liter Krueger Pressure Filter is employed. Test results are shown in Table II.

EXAMPLE 3

The Experimental Procedure set forth above is followed in every material detail except that a 1 liter Krueger Pressure Filter is employed and the dewatering aid constitutes a 50:50 mixture of the dewatering aid of Example 1 and the reaction product of 1 mole of a secondary alcohol having ten to fifteen carbon atoms in the alkyl moiety with 3 moles of ethylene oxide. Test results are given in Table II.

COMPARATIVE EXAMPLE E

The procedure of Comparative Example A is followed in every material detail except that a 1 liter Krueger Pressure Filter is employed. Test results are shown in Table II.

COMPARATIVE EXAMPLE F

The Experimental Procedure is followed in every material detail except that a 1 liter Krueger Pressure Filter is employed and the dewatering aid comprises the reaction product of 1 mole of a secondary alcohol having ten to fifteen carbon atoms in the alkyl moiety and 3 moles of ethylene oxide. Test results are shown in Table II.

COMPARATIVE EXAMPLE G

The procedure of Comparative Example D is followed in every material detail except that a 1 liter Krueger Pressure Filter is employed. Test results are shown in Table II.

TABLE II

| EXAMPLE | DOSAGE (16/ton Solids) | PERCENT MOISTURE |
| --- | --- | --- |
| Comparative G | None | 19.2 |
|  | None | 18.7 |
|  | None | 18.5 |
|  | None | 18.4 |
| 2 | 0.2 | 16.4 |
|  | 0.3 | 15.5 |
|  | 0.4 | 14.8 |
|  | 0.4 | 15.0 |
|  | 0.5 | 14.9 |
|  | 0.5 | 15.4 |
|  | 0.6 | 14.3 |
| 3 | 0.2 | 17.0 |
|  | 0.3 | 16.2 |
|  | 0.4 | 15.2 |
|  | 0.4 | 16.0 |
|  | 0.5 | 14.6 |
|  | 0.5 | 14.9 |
|  | 0.6 | 14.6 |
|  | 0.6 | 14.2 |
|  | 0.7 | 15.0 |
| Comparative E | 0.3 | 15.9 |
|  | 0.4 | 16.0 |
|  | 0.5 | 16.7 |
|  | 0.6 | 17.0 |
| Comparative F | 0.4 | 16.9 |
|  | 0.5 | 15.7 |
|  | 0.5 | 15.2 |
|  | 0.6 | 16.2 |
|  | 0.6 | 15.2 |
|  | 0.75 | 14.1 |
|  | 0.75 | 14.0 |
|  | 1.0 | 14.5 |
|  | 1.0 | 14.1 |

EXAMPLE 4

When the procedure of Example 1 is followed in every material detail except that the dewatering aid employed therein is of the general structure:

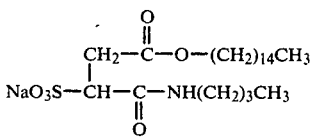

substantially equivalent results are obtained.

EXAMPLE 5

When the procedure of Example 1 is followed in every material detail except that the dewatering aid employed therein is of the general structure:

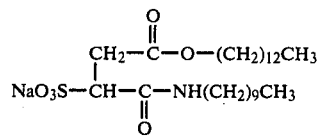

substantially equivalent results are obtained.

EXAMPLE 6

When the procedure of Example 1 is followed in every material detail except that the dewatering aid employed therein is of the general structure:

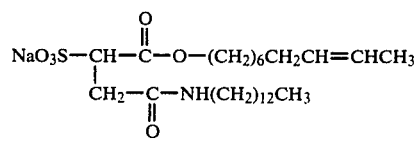

substantially equivalent results are obtained.

EXAMPLE 7

When the procedure of Example 1 is followed in every material detail except that the dewatering aid employed therein is of the general structure:

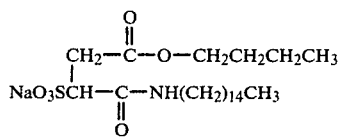

substantially equivalent results are obtained.

EXAMPLES 8-12

When the procedure of Example 1 is followed in every material detail except that the dosage of the dewatering aid therein employed is varied in the amounts of 1.0, 2.0, 3,0, 4.0 and 5.0 pounds per ton of solids, respectively, effective dewatering is achieved.

We claim:
1. A process for dewatering mineral and coal concentrates which comprises mixing with an aqueous slurry of the mineral or coal concentrate a dewatering aid in an amount ranging from about 0.15 pound per ton to about 5.0 pounds per ton, said dewatering aid consisting essentially of an N-monosubstituted sulfosuccinamate of the general structure:

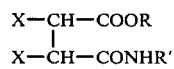

wherein R is a linear or branched aliphatic radical having four to fifteen carbon atoms, inclusive, R' is a linear or branched aliphatic radical having four to fifteen carbon atoms, inclusive, and X is hydrogen or a sulfonate salt, there being one X as hydrogen and one X as a sulfonate salt, and thereafter dewatering the treated slurry by filtration.

2. The process of claim 1 wherein R is a linear or branched aliphatic radical having six to ten carbon atoms, inclusive.

3. The process of claim 1 wherein R is 2-ethylhexyl.

4. The process of claim 1 wherein R' is a linear or branched aliphatic radical having six to ten carbon atoms inclusive.

5. The process of claim 1 wherein R' is n-octyl.

6. The process of claim 1 wherein the dewatering aid dosage is from about 0.2 pound per ton to 1.0 pound per ton.

7. The process of claim 1 wherein the dewatering aid employed is sodium N-octyl, 2-ethylhexyl sulfosuccinamate.

8. The process of claim 1 wherein the dewatering aid employed is used in conjunction with nonionic surfactant, the total dosage of the dewatering aid and the nonionic surfactant within the range of from about 0.15 pounds per ton to about 5.0 pounds per ton.

* * * * *